US007769258B2

(12) United States Patent
Kathman et al.

(10) Patent No.: US 7,769,258 B2
(45) Date of Patent: Aug. 3, 2010

(54) OPTICAL ELEMENT AND SYSTEM USING THE SAME

(75) Inventors: Alan D. Kathman, Charlotte, NC (US); Charles S. Koehler, Charlotte, NC (US); William H. Welch, Charlotte, NC (US); Eric G. Johnson, Winter Park, FL (US); Robert D. Tekolste, Charlotte, NC (US)

(73) Assignee: Tessera North America, Inc., Charlotte, NC (US)

( * ) Notice: Subject to any disclaimer, the term of this patent is extended or adjusted under 35 U.S.C. 154(b) by 0 days.

(21) Appl. No.: 12/453,229

(22) Filed: May 4, 2009

(65) Prior Publication Data

US 2009/0226134 A1    Sep. 10, 2009

Related U.S. Application Data

(63) Continuation of application No. 12/073,748, filed on Mar. 10, 2008, now Pat. No. 7,529,446, which is a continuation of application No. 11/802,044, filed on May 18, 2007, now Pat. No. 7,343,069, which is a continuation of application No. 10/320,525, filed on Dec. 17, 2002, now Pat. No. 7,221,823, which is a continuation of application No. 09/614,184, filed on Jul. 11, 2000, now Pat. No. 6,496,621, which is a continuation-in-part of application No. 09/329,996, filed on Jun. 11, 1999, now Pat. No. 6,530,697.

(60) Provisional application No. 60/101,367, filed on Sep. 22, 1998.

(51) Int. Cl.
  *G02B 6/32* (2006.01)
(52) U.S. Cl. .......................... 385/33; 385/36
(58) Field of Classification Search ............ 385/33
  See application file for complete search history.

(56) References Cited

U.S. PATENT DOCUMENTS

| | | | |
|---|---|---|---|
| 3,809,455 A | 5/1974 | Pekau et al. | |
| 4,045,120 A | 8/1977 | De Corlieu et al. | |
| 4,709,413 A | 11/1987 | Forrest et al. | |
| 4,799,755 A | 1/1989 | Jones | |
| 4,834,484 A | 5/1989 | Gorman et al. | |
| 4,865,409 A | 9/1989 | Althaus et al. | |
| 5,052,772 A | 10/1991 | Okamoto et al. | |
| 5,113,244 A | 5/1992 | Curran | |
| 5,117,472 A | 5/1992 | Blyler, Jr. et al. | |
| 5,243,681 A | 9/1993 | Bowen et al. | |
| 5,278,679 A * | 1/1994 | Davis et al. | 359/19 |
| 5,381,499 A | 1/1995 | Takenaka et al. | |
| 5,388,171 A | 2/1995 | Michikoshi et al. | |

(Continued)

FOREIGN PATENT DOCUMENTS

EP    0 595 449    5/1991

(Continued)

*Primary Examiner*—Charlie Peng
*Assistant Examiner*—Eric Wong
(74) *Attorney, Agent, or Firm*—Lee & Morse, P.C.

(57) ABSTRACT

An optical element may include a first diffractive structure having a radially symmetric amplitude function and a second diffractive structure having a phase function. The second diffractive structure may serve as a vortex lens. A system employing the optical element may include a light source and/or a detector.

14 Claims, 3 Drawing Sheets

U.S. PATENT DOCUMENTS

| | | | |
|---|---|---|---|
| 5,405,659 | A | 4/1995 | Fernandez |
| 5,416,862 | A | 5/1995 | Haas et al. |
| 5,504,826 | A | 4/1996 | Shibutani et al. |
| 5,557,471 | A | 9/1996 | Fernandez |
| 5,638,396 | A | 6/1997 | Klimek |
| 5,661,835 | A | 8/1997 | Kato et al. |
| 5,696,862 | A | 12/1997 | Hauer et al. |
| 5,763,870 | A | 6/1998 | Sadler et al. |
| 5,793,489 | A | 8/1998 | Kotidis et al. |
| 5,898,802 | A | 4/1999 | Chen et al. |
| 5,963,696 | A | 10/1999 | Yoshida et al. |
| 6,064,786 | A | 5/2000 | Cunningham et al. |
| 6,243,508 | B1 | 6/2001 | Jewell et al. |
| 6,264,377 | B1 | 7/2001 | Mitsuda et al. |
| 6,504,975 | B1 | 1/2003 | Yamagata et al. |
| 6,600,845 | B1 | 7/2003 | Feldman et al. |
| 6,822,794 | B2 | 11/2004 | Coleman et al. |
| 6,856,460 | B2 | 2/2005 | Coleman et al. |
| 7,149,383 | B2 | 12/2006 | Chen |

FOREIGN PATENT DOCUMENTS

| | | |
|---|---|---|
| GB | 2 252 843 | 8/1992 |
| JP | 4-034505 | 2/1992 |
| WO | WO 00/13051 | 3/2000 |

\* cited by examiner

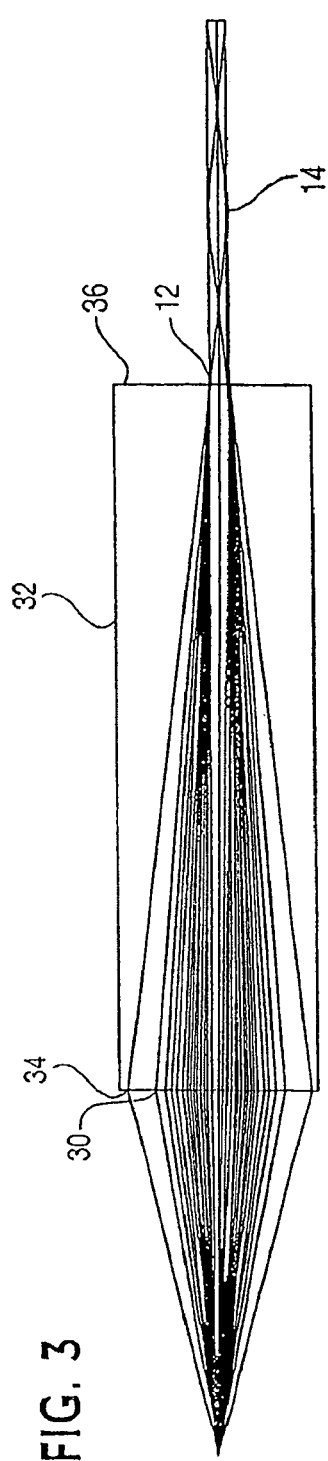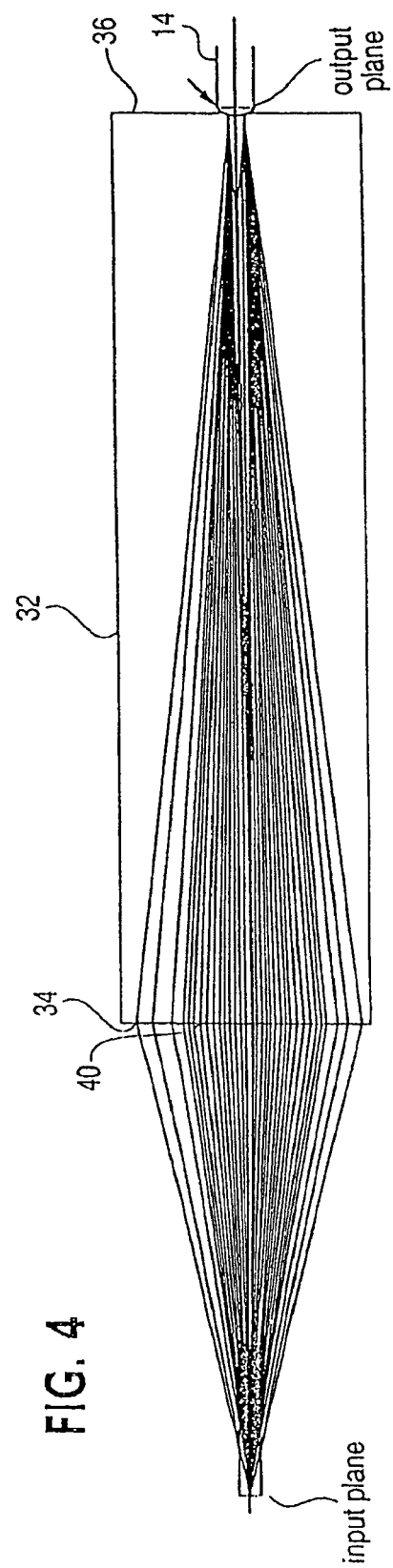

OPTICAL ELEMENT AND SYSTEM USING THE SAME

CROSS-REFERENCES TO RELATED APPLICATIONS

The present application is a continuation of application Ser. No. 12/073,748, filed Mar. 10, 2008, now U.S. Pat. No. 7,529,446, which in turn is a continuation of Ser. No. 11/802,044, filed May 18, 2007, now U.S. Pat. No. 7,343,069 B2, which in turn is a continuation of Ser. No. 10/320,525, filed Dec. 17, 2002, now U.S. Pat. No. 7,221,823 B2, which is a continuation of Ser. No. 09/614,184, filed Jul. 11, 2000, now U.S. Pat. No. 6,496,621, which is a continuation-in-part of U.S. patent application Ser. No. 09/329,996, filed Jun. 11, 1999, now U.S. Pat. No. 6,530,697, which claims priority under 35 U.S.C. §119 to Provisional Application No. 60/101,367 filed on Sep. 22, 1998, the entire contents of all of which are hereby incorporated by reference for all purposes.

BACKGROUND OF THE INVENTION

1. Field of the Invention

Embodiment of the present invention are directed to an optical element having both an amplitude diffractive structure and a phase diffractive structure and/or a vortex lens.

2. Description of Related Art

As the use of non-physical contact connections between light sources and fibers increases, the need for effective isolation to prevent light reflected at the fiber interface from being returned to the light source increases. Feedback to the light source may result in spectral broadening, light source instability, and relative intensity noise, which affect the monochromaticity of the light source. As data rates go up, the systems become more sensitive to relative intensity noise and require low bit error rates. Conventional optical isolators using polarization effects to attenuate reflection are very expensive, making the non-physical contact impractical. The importance of avoiding feedback is further increased when trying to use cheaper light sources, such as vertical cavity surfaces emitting laser diodes and light emitting diodes.

One solution that avoids the use of an optical isolator is a mode scrambler that divides power from the light source into many modes. A configuration employing a mode scrambler includes a single mode pigtail that provides light from the light source to the mode scrambler that then delivers the light to a transmission cable via an air-gap connector. Since any reflected power will still be divided across the many modes, any reflected power in the mode that can efficiently be coupled into the pigtail is only a small fraction of the total reflected power, thereby reducing return losses. However, this solution involves aligning another fiber, physically contacting the fiber with the mode scrambler, and placing the light source against the fiber. This pigtailing is expensive. Thus, there still exists a need for true non-physical contact connection between a light source and a transmission system that does not require an isolator.

SUMMARY OF THE PRESENT INVENTION

The present invention is therefore directed to an optical element that substantially overcomes one or more of the problems due to the limitations and disadvantages of the related art.

In accordance with embodiments, an optical element may include a first diffractive structure having a radially symmetric amplitude function, and a second diffractive structure having a phase function.

In accordance with embodiments, a system may include an optical element having a first diffractive structure having a radially symmetric amplitude function and a second diffractive structure having a phase function, and a detector receiving light output from the optical element.

The first and second diffractive structures may be on a same surface or may be on opposite surface of a same substrate. A thickness of the same substrate may determine a numerical aperture of the optical element. The second diffractive structure may be adapted to output light having corkscrew wave. The first diffractive structure may be adapted to focus light In accordance with embodiments, a system may include a light source outputting light having a symmetric wavefront, and a vortex lens receiving light having the symmetric wavefront from the light source and outputting light having a corkscrew wave.

The vortex lens may be a diffractive optical element. The symmetric wavefront is a planar wavefront. The system may include a mount substrate for the light source and an optics substrate for the vortex lens. The system may include a spacer between the mount substrate and the optics substrate. The spacer and the optics substrate may enclose the light source. The vortex lens may be a lithograph, e.g., a diffractive optical element.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

BRIEF DESCRIPTION OF THE DRAWINGS

The foregoing and other objects, aspects and advantages will be described with reference to the drawings, in which:

FIG. 3 is a schematic illustration of another embodiment of the coupler of the present invention; and FIG. 4 is a schematic illustration of another embodiment of the coupler of the present invention.

DETAILED DESCRIPTION

Figure 1:
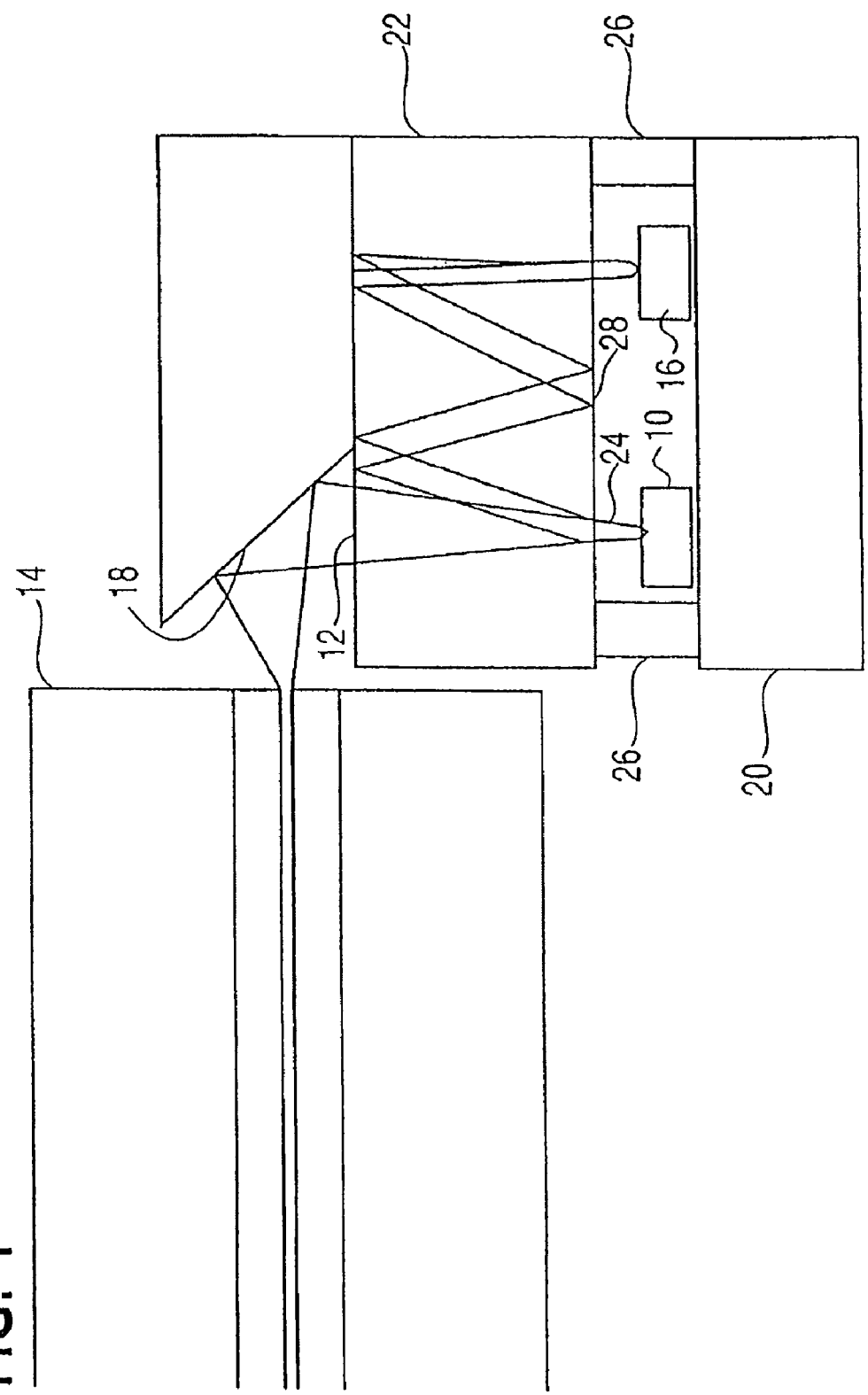
FIG. 1 shows the integration of the coupler of the present invention with a light source, a fiber and a light source power monitor.

FIG. 1 illustrates a light source 10, here a VCSEL, a coupler 12 and a multi-mode fiber 14 integrated with a power monitor 16 and a reflective surface 18 for directing the light into the fiber 14. In particular, the light source 10 and the power monitor 16 are provided on a substrate 20. Another substrate 22 has the coupler 12 thereon, preferably on the face furthest from the light source to allow the beam to expand, and a splitting diffractive element 24 which splits off a portion of the light from the light source 10 to be monitored. The substrates 20, 22 are preferably mounted with spacer blocks 26, which provide the desired separation between the substrates 20, 22. The coupler 12 may also be provided in a common housing with the fiber 14.

The light split off by the diffractive element 24 is directed to the power monitor 16 to monitor the operation of the light source 10. The directed of the light to the power monitor 16 may be achieved by providing appropriately positioned reflective portions 28. The number of times the light to be monitored traverses the substrate 22 is a design choice, depending on the initial angle of diffraction and the desired positioning of the power monitor 16. This monitoring is set forth in commonly assigned U.S. application Ser. No. 09/386,280, entitled "A Diffractive Vertical Cavity Surface Emitting Laser Power Monitor and System" filed Aug. 31, 1999, which is hereby incorporated by reference in its entirety for all purposes. Alternatively, the power monitoring may be realized using an integrated detector, without the need for the deflecting element, as set forth in commonly assigned U.S. application Ser. No. 09/548,018, entitled "Transmission Detection for Vertical Cavity Surface Emitting Laser Power Monitor and System" filed Apr. 12, 2000, which is hereby incorporated by reference in its entirety for all purposes The light that is not split off by the diffractive element 24 proceeds to the coupler 12. A reflective surface 18, such as a polished angular face of another substrate, is provided to direct the light from the coupler 12 into the multi-mode fiber 14. Preferably all the optical elements are formed lithographically and all the elements are integrated on a wafer level.

In accordance with the present invention, the coupler 12 is a diffractive element that matches the phase as well as the intensity distribution of the beam. The matching of the phases generates spiral propagation of the beam through the fiber. This spiral or vortex propagation maintains the intensity profile input to the fiber along the fiber. Since the beam travels in a corkscrew, the amount of light crossing the center of the fiber is significantly reduced. Ideally, the amount of light in the center will be zero, but in practice, the amount of light is on the order of 10% or less. In contrast, when only the intensity distribution is controlled, as in the first two designs of the parent application, the input intensity profile may be the desired profile, but will quickly degrade as the light traverses the fiber, In other words, while the other designs may provide an input profile that is substantially null on axis, this profile is only maintained for the depth of focus of the coupler. When also matching the phase, this profile is maintained substantially beyond the depth of focus of a lens having the same numerical aperture as the beam to be input to the fiber, e.g., at least an order of magnitude longer. Absent the fiber, the null space of the beam profile is maintained through free space, which significantly reduces the alignment requirement. Further, by matching the phase and amplitude of the beam to a certain mode of the fiber, theoretically the beam profile could be maintained over an infinite length of fiber. However, imperfections in the real world, e.g., in the fiber, in the beam, in the matching, degrade from this theoretical scenario.

Thus, in order to avoid low order modes in a GRIN fiber launch, the amplitude and phase of the higher order modes need to be matched. The following equations are set forth in Fields and Waves in Communication Electronics, Simon Ram et al. 1984, particularly pp. 765-768, which is hereby incorporated by reference in its entirety. For a GRIN fiber, these eigenmodes all have the form set forth in Equation (1):

$$E(r,\theta,z) \propto f_{mp}(r) e^{\pm jm\theta} e^{\pm j\beta_{mp}z} \quad (1)$$

where f(r) is a function that depends only on r for given modes within a specific fiber, r is the radius from the axis, θ is the angle from the axis, z is the distance along the axis, m is the azimuthal mode number, β is a propagation constant, p is the radial mode number. When m, p=0, the beam has a Gaussian profile.

While Equation (1) could be used to match a particular mode of the fiber by creating an input light beam having an amplitude and phase function which exactly correspond to the particular mode, such matching is not required and may not even be desirable, as matching the amplitude as well as the phase increases the requirements on the optics. As long as m>0, the azimuthal mode m will have a phase function that is a spiral ring, whether the light is traveling in free space or in a fiber. Once the phase function for at least one higher order mode, i.e., m>0, has been matched, a null at the center of the beam is created after the beam having been phase matched propagates over a short distance, e.g., a few wavelengths. Unlike other types of matching, this null is maintained in the center in both free space and the fiber, so such an optical element providing such matching does not have to be immediately adjacent to the fiber. As evident from Equation (1), when matching the phase, the value of p doesn't matter.

In order to suppress the lowest order mode, i.e., m=0, a phase term needs to be added to the wavefront. This is accomplished through the use of the following diffractive phase function encoded onto the wavefront set forth in Equation (2):

$$\phi(x, y) = m \arctan\left(\frac{y}{x}\right) \quad (2)$$

where φ is the phase function, x and y are the coordinates in the plane. In general, there will be several modes propagating, e.g., m=1-5. The spiral mode may be realized by matching the phase function for m=3.

This phase function can be added to a lens function and encoded as a mod(2π) diffractive element as set forth in Equation (3):

$$\phi(x, y) = \frac{\pi(x^2 + y^2)}{\lambda f} + m \arctan\left(\frac{y}{x}\right) \quad (3)$$

Figure 2A:
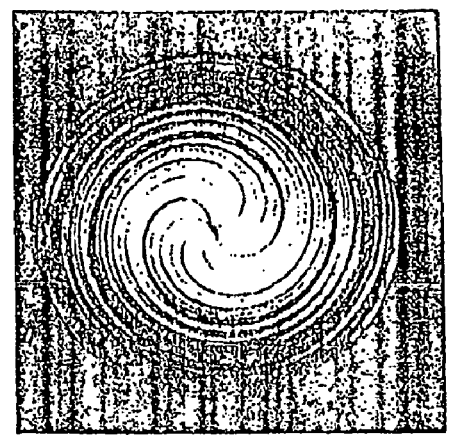
FIGS. 2A-2C illustrate a diffractive element and associated characteristics of a spiral generator for use as the coupler in accordance with one embodiment of the present invention.
Figure 2B:
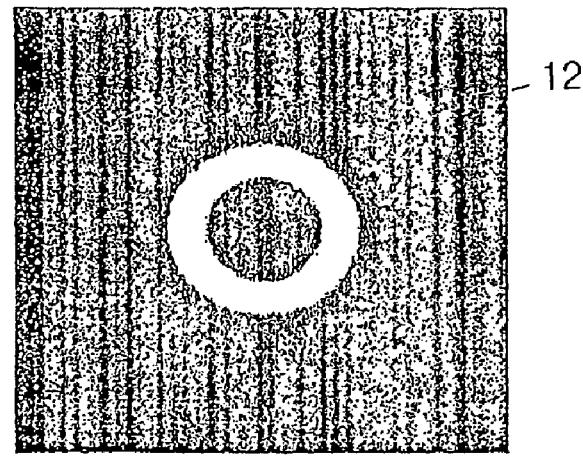
Figure 2C:
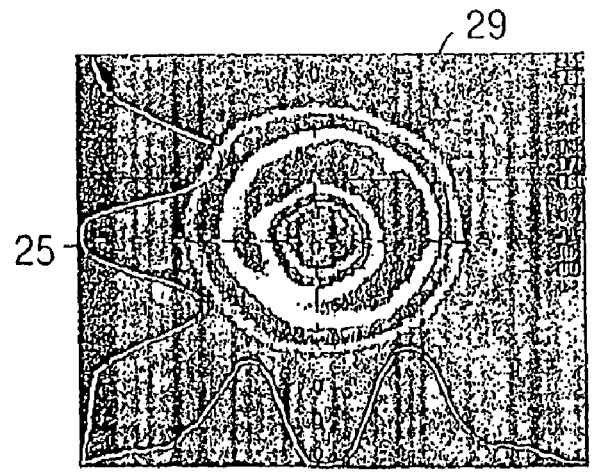

FIG. 2A illustrates the mod(2π) diffractive element and the corresponding intensity to in the focal plane of the lens function. FIG. 2B illustrates an actual example of a diffractive optical element 12 created in accordance with Equation (3). FIG. 2C illustrates the simulated ring intensity 25 and the measured intensity pattern 29 of the element 12 in FIG. 2B. A refractive equivalent in accordance with Equation (3) of the phase matching diffractive 12 may be alternately employed.

This phase matching coupler 12 is not a true beam shaper, since each point in the input plane is mapped into more than one point in the output plane because of the axial singularity. Unlike a diffuser, each point in the input plane is not mapped to every point in the output plane.

The phase matching coupler 12 allows the desired angular distribution to be substantially maintained along a portion of the fiber. This may be quantified by measuring the amount of power within a certain radius of the fiber at a certain distance along the fiber. The phase matching of the present invention allows more power to be contained within the desired radii for a longer distance than methods not employing phase matching. For example, by aligning the coupler and a GRIN fiber along the same axis, using a 850 nm source, and matching both the phase and the amplitude, the encircled energy can be maintained to less than 12.5% is a radius of less than 4.5 microns and 75% for a radius less than 15 microns, with no power in the fiber center, for over 6 m.

By matching the phases, the light from the coupler is input to the fiber traveling in a circular direction, i.e., the path of the light down the fiber forms a corkscrew. Such traversal is opposed to the linear travel normally occurring down the fiber. By traveling in a corkscrew or spiral mode, the input distribution, typically annular, of the input light is maintained along the fiber. Without the phase matching, while the initial input light has the desired shape, this shape is not retained throughout the traversal of the fiber. Therefore, more modal dispersion will be present, with more light in the center of the fiber, if phase matching is not used.

In addition to efficiently coupling the light into the fiber, the phase matching coupler 12 also reduces the power being fedback into the light source 10. Since the phases are matched, and the reflected light will not have the same phase as it did when originally incident on the phase matching coupler 12, the phase matching coupler 12 will not return the light back to the light source as it came. In other words, when the reflected light traverses the system, it will be further deflected by the phase matching coupler 12, thereby reducing the power fedback into the light source 10.

The back reflection reduction of the phase matching coupler only operates sufficiently when the phase matching coupler 12 is far enough away from the fiber so that the phase is sufficiently changed to prevent being redirected in the same manner. In other words, if the phase matching coupler 12 is placed in contact with the end of the fiber, while the coupler will still serve to maintain the input distribution, since the reflected light will have essentially the same phase as the input light, the light will be returned substantially back to the light source as it came. However, if the phase matching coupler 12 is placed at least roughly three times the diameter of the beam incident on the fiber, there is sufficient alteration of the phase due to traversal that the reflect light incident on the phase matching coupler 12 will be further deflected.

Further reductions to the amount of light being fedback to the light source 10 may be realized by using a lens 30 in addition to the phase matching coupler 12 as shown in FIG. 3. This lens 30 is used to shape the light to provide additional reduction in the power feedback to the light source. The lens 30 is preferably a diffractive surface that is a combination of a lens function having radially symmetric terms with a negative axicon function. When the phase matching coupler 12 is spaced away from the fiber, the lens 30 may simply form a ring, since the phase matching coupler will prevent the light from being retraced. As shown in FIG. 3, the lens 30 is on a first surface 34 of a wafer 32. The phase matching coupler 12 is provided on a second surface 36 of the wafer 32, opposite the first surface. The thickness of the wafer 32 controls the numerical aperture of the image. Alternatively, the phase matching coupler 12 may be formed on the same surface as the lens 30.

The lens 30 allows an annular intensity ring to be optimized for the particular fiber 14. Also, by forming this ring prior to the phase matching coupler 12, a smaller radial segment of the phase matching coupler is used. As can be seen from equation (2), as m increases, the amount of phase twist increases. Thus, rays at the center of the phase matching coupler 12 receive a larger skew angle that rays at the edge of the phase matching coupler. By shaping the light into an annulus, this central portion is avoided, reducing the aberrations introduced by the phase matching coupler 12. Again, the light reflected back from the fiber 14 will not have the same phase as the light incident on the phase matching coupler 12, so the light will be further deflected by the phase matching coupler 12. Since the deflection angles are now altered from that of the light source, the lens 30 will not focus the light back onto the light source, but will further deflect the light away from the light source.

Another embodiment is shown in FIG. 4. Here, the phase matching coupler 12 is not used, only a reciprocal, phase sensitive system 40. An optical element will map an optical distribution, i.e., amplitude and phase distribution in an input plane to an output plane. If an optical element is a reciprocal optical, it will map the same optical distribution in an output plane back to the original optical distribution in the input plane, as long as the light has the same phase and intensity profile. Optical systems that perform one-to-one mapping, such as an imaging lens, are reciprocal, but are also phase insensitive when performing a mapping between an object plane and an image plane, i.e., a change in phase will not affect the mapping between the image and object planes. However, other optical systems, such as those that perform a one to many mapping, i.e., in which one point in the input plane is mapped to more than one point in the output plane, while reciprocal, are typically phase sensitive. In other words, a phase change will alter how the light in the output plane is returned to the input plane. An example of such a system is a negative axicon.

In the preferred embodiment, this system 40 also creates an intensity ring on the plane at which the fiber 14 is located. The reflection from the fiber creates a ring back onto the system 40, but the phase of the light has been altered due to the reflection. This change in phase results in the light traversing the system 40 having an increased diameter of the ring in the object plane, rather than returning the ring to the point source of the light source. This increased diameter results in most of the light missing the input of the light source, significantly reducing feedback. Any other reciprocal, phase sensitive system that results in most of the light avoiding the light source may be used. The phase matching coupler 12 may still be employed in any position to increase coupling bandwidth and/or enhance the feedback suppression.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

What is claimed is:

1. A vortex lens, comprising a diffractive surface defined by a surface function having a radially symmetric phase function and an angularly symmetric phase function, the surface function being selectively adjustable to control launch conditions and manage reflections, wherein the angularly symmetric phase function is given by $$m \arctan\left(\frac{y}{x}\right),$$

where m is a mode number indicating a speed with which a phase of the angularly symmetric phase function is changing.

2. The vortex lens as claimed in claim 1, wherein the radially symmetric phase function is a lens function.

3. The vortex lens as claimed in claim 2, wherein the lens function is given by $$\frac{\pi(x^2 + y^2)}{\lambda f},$$

where f is the focal length of the lens function and $\lambda$ is a wavelength of the light source.

4. The vortex lens as claimed in claim 1, wherein m equals 3.

5. The vortex lens as claimed in claim 1, wherein the radially symmetric phase function is a polynomial.

6. The vortex lens as claimed in claim 5, wherein the polynomial is a polynomial expansion.

7. An optical system configured to transfer light from a light source to an optical fiber, the optical system comprising a diffractive surface defined by a surface function having a radially symmetric phase function and an angularly symmetric phase function, the surface function being selectively adjustable to control launch conditions and manage reflections, wherein the angularly symmetric phase function is given by $$m \arctan\left(\frac{y}{x}\right),$$

where m is a mode number indicating a speed with which a phase of the angularly symmetric phase function is changing.

8. The optical system as claimed in claim 7, wherein the radially symmetric phase function is a lens function.

9. The optical system as, claimed in claim 8, wherein the lens function is given by $$\frac{\pi(x^2 + y^2)}{\lambda f},$$

where f is the focal length of the lens function and $\lambda$ is a wavelength of the light source.

10. The optical system as claimed in claim 7, wherein m equals 3.

11. The device as claimed in claim 7, wherein the radially symmetric phase function is a polynomial.

12. The device as claimed in claim 11, wherein the polynomial is a polynomial expansion.

13. A vortex lens, comprising a diffractive surface defined by a surface function having a radially symmetric phase function and an angularly symmetric phase function, the surface function being selectively adjustable to control launch conditions and manage reflections, wherein the radially symmetric phase function is a lens function given by $$\frac{\pi(x^2 + y^2)}{\lambda f},$$

where f is the focal length of the lens function and $\lambda$ is a wavelength of the light source.

14. An optical system configured to transfer light from a light source to an optical fiber, the optical system comprising a diffractive surface defined by a surface function having a radially symmetric phase function and an angularly symmetric phase function, the surface function being selectively adjustable to control launch conditions and manage reflections, wherein the radially symmetric phase function is a lens function given by $$\frac{\pi(x^2 + y^2)}{\lambda f},$$

where f is the focal length of the lens function and $\lambda$ is a wavelength of the light source.

* * * * *